United States Patent
Villers et al.

[11] Patent Number: 6,125,617
[45] Date of Patent: Oct. 3, 2000

[54] CUT CROP PROCESSING MECHANISM FOR A FORAGE HARVESTER INCORPORATING A PIVOTABLE AUGER

[75] Inventors: Roger L. Villers, Fredonia; Russell J. Kempf, Kewaskum, both of Wis.

[73] Assignee: Gehl Company, West Bend, Wis.

[21] Appl. No.: 09/153,441

[22] Filed: Sep. 15, 1998

[51] Int. Cl.$^7$ .................................................. A01D 34/00
[52] U.S. Cl. .................................................. 56/2; 56/15.3
[58] Field of Search ................................ 56/15.3, 15.1, 56/14.9, 15.5, 95, 2; 241/101.742, 186.3, 222

[56] References Cited

U.S. PATENT DOCUMENTS

| | | |
|---|---|---|
| 2,540,264 | 2/1951 | Hitchcock . |
| 2,989,829 | 6/1961 | Heth et al. . |
| 3,023,560 | 3/1962 | Krahn . |
| 3,263,405 | 8/1966 | Rohmfeld . |
| 3,357,164 | 12/1967 | Hennen . |
| 3,513,646 | 5/1970 | Johnston et al. . |
| 3,623,298 | 11/1971 | Hitzhusen . |
| 3,646,735 | 3/1972 | Fritz .......................... 56/14.7 |
| 3,680,291 | 8/1972 | Soteropulos . |
| 3,701,239 | 10/1972 | Hennen . |
| 3,913,303 | 10/1975 | Blake et al. . |
| 3,933,314 | 1/1976 | Luscombe . |
| 3,977,165 | 8/1976 | Klinner et al. . |
| 4,245,948 | 1/1981 | Kersten . |
| 4,315,395 | 2/1982 | Randall et al. .............. 56/10.1 |
| 4,345,417 | 8/1982 | deBuhr et al. . |
| 4,385,483 | 5/1983 | McIlwain .................... 56/228 |
| 4,472,927 | 9/1984 | Vogt et al. . |
| 4,516,392 | 5/1985 | McLean et al. . |
| 4,546,599 | 10/1985 | Cicci et al. . |
| 4,587,799 | 5/1986 | Thomas et al. . |
| 4,617,786 | 10/1986 | Fell et al. . |
| 4,677,814 | 7/1987 | Anderson et al. ............. 56/15.6 |
| 4,678,129 | 7/1987 | Dallinger . |
| 4,696,432 | 9/1987 | Russ et al. .................. 241/101.7 |
| 4,846,198 | 7/1989 | Carnewal et al. ............. 460/21 |
| 4,949,535 | 8/1990 | Hurlburt . |
| 5,005,342 | 4/1991 | Lundahl et al. .............. 56/10.2 |
| 5,036,652 | 8/1991 | Schmittbetz et al. . |
| 5,152,127 | 10/1992 | Koegel et al. . |
| 5,499,948 | 3/1996 | Underwood ................. 460/119 |
| 5,863,005 | 1/1999 | Bramstedt et al. ............ 241/101.174 |

Primary Examiner—Thomas B. Will
Assistant Examiner—Meredith C. Petravick
Attorney, Agent, or Firm—Andrus, Sceales, Starke & Sawall

[57] ABSTRACT

A pull-type harvester includes a cutterhead assembly and a conveying assembly, such as an auger, which conveys cut crop material to a discharge blower. These components define a flow path for cut crop material through the harvester, and a crop processing mill is removably positionable within the flow path for processing the cut crop material in certain conditions for enhancing digestibility of the crop material. The auger assembly is pivotably mounted to the harvester, and is movable so as to accommodate placement of the crop processing mill in the flow path or removal of the crop processing mill therefrom. Filler members are provided for enclosing spaces formed in the crop material flow path resulting from pivoting movement of the auger assembly. The crop processing mill can be selectively installed between the cutterhead and the auger for selectively providing crop processing capability when desired, and the crop processing mill can be removed if conditions do not require crop processing capabilities.

30 Claims, 8 Drawing Sheets

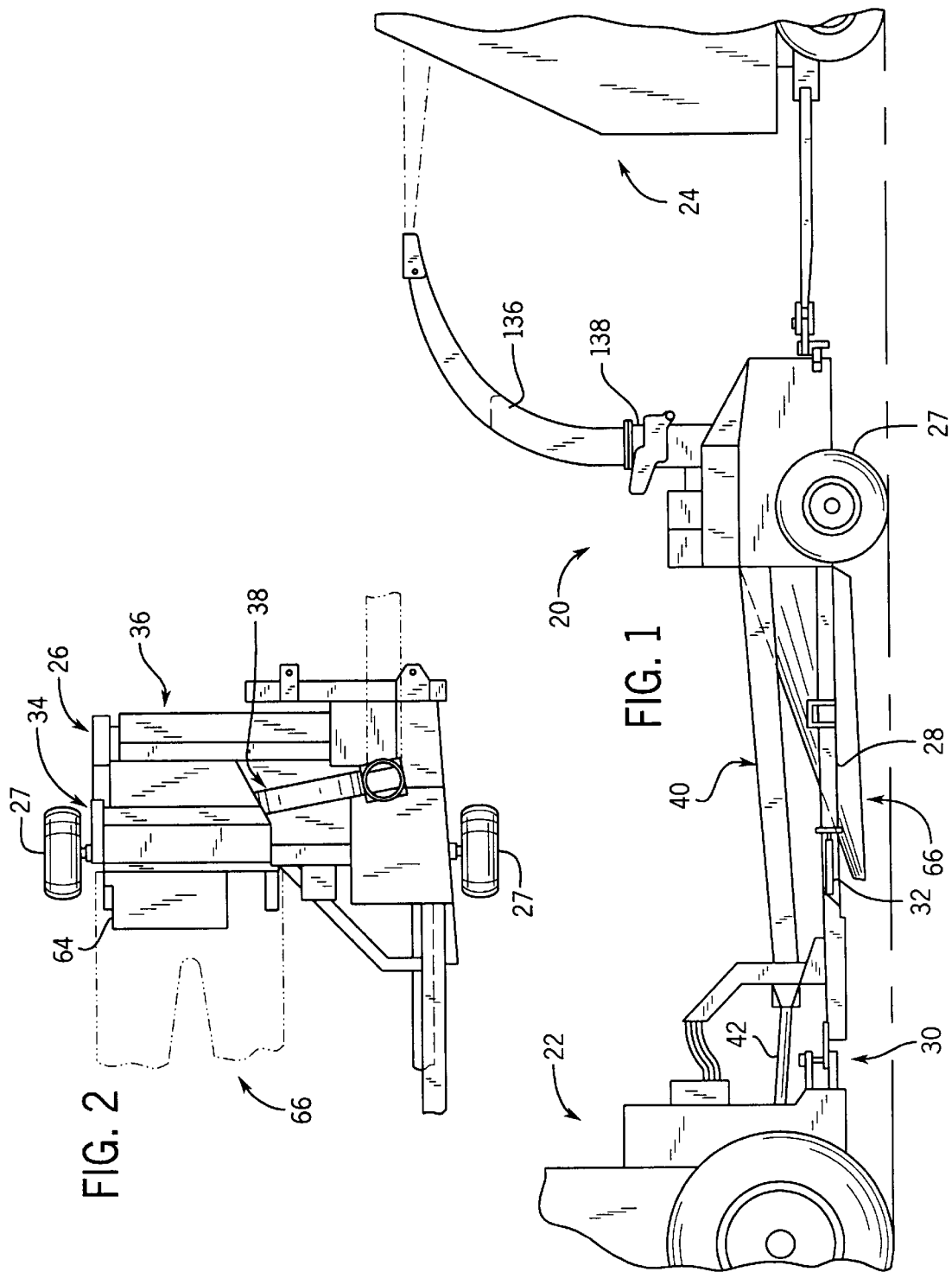

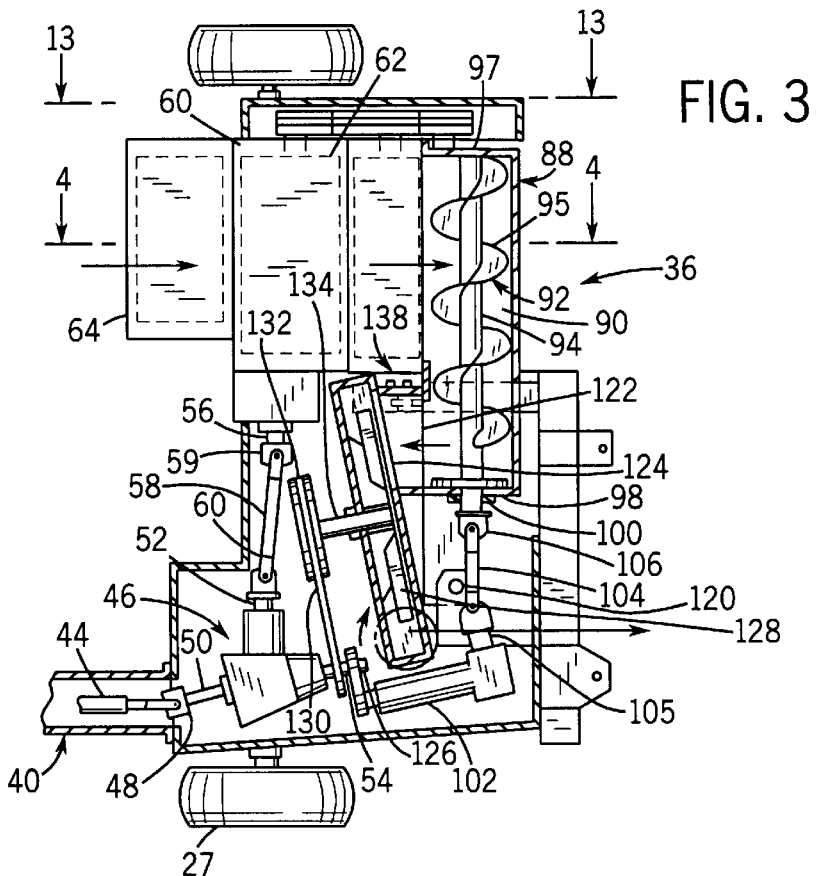
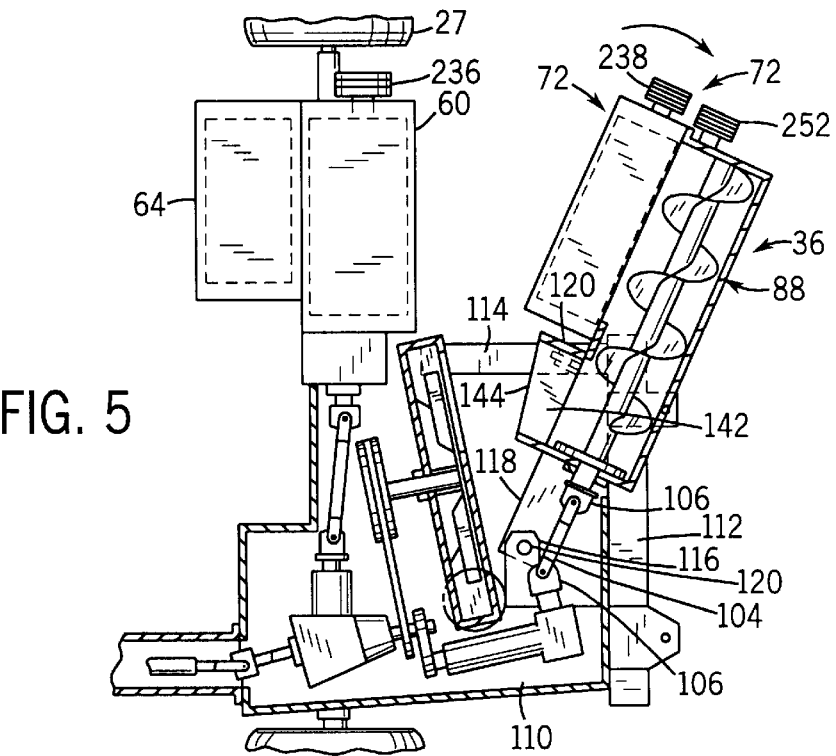

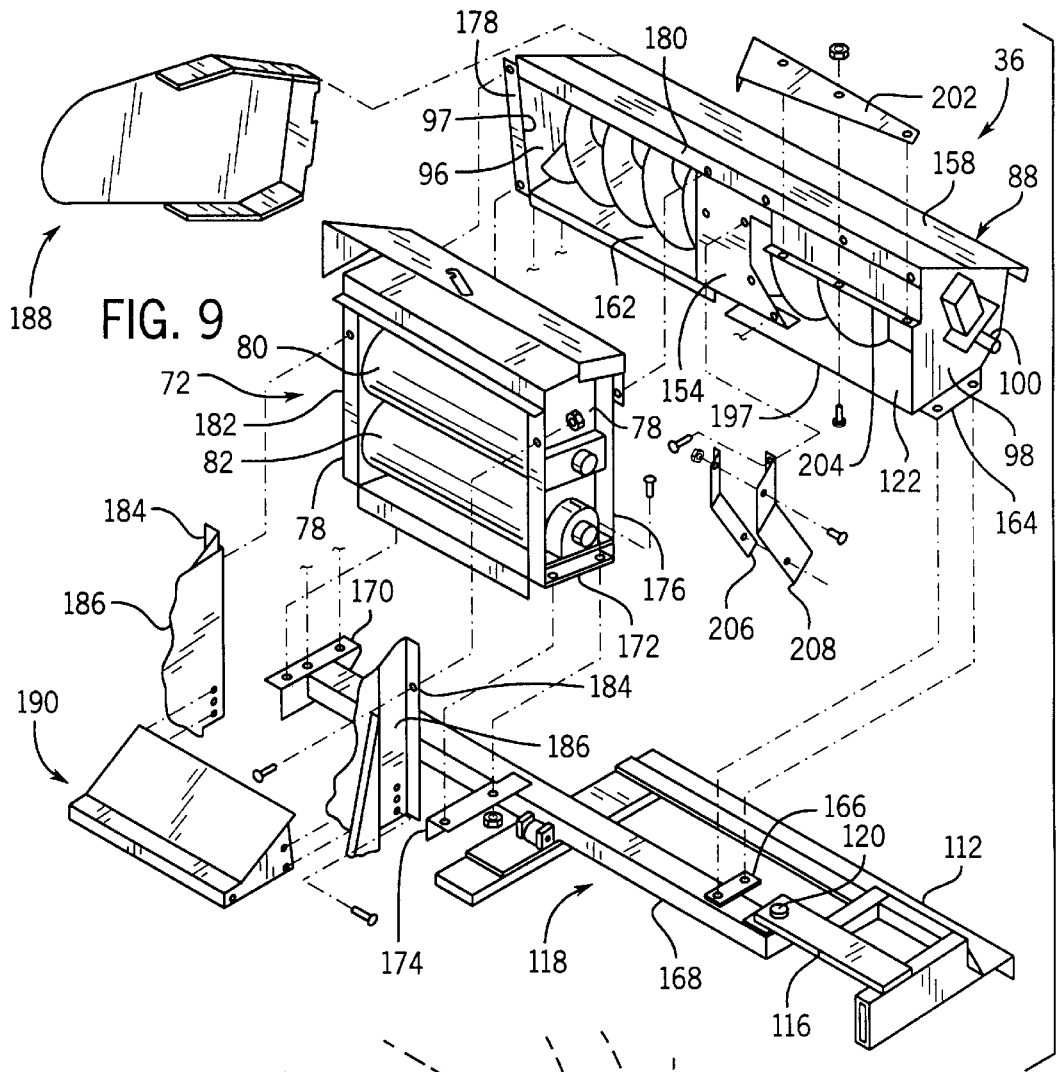
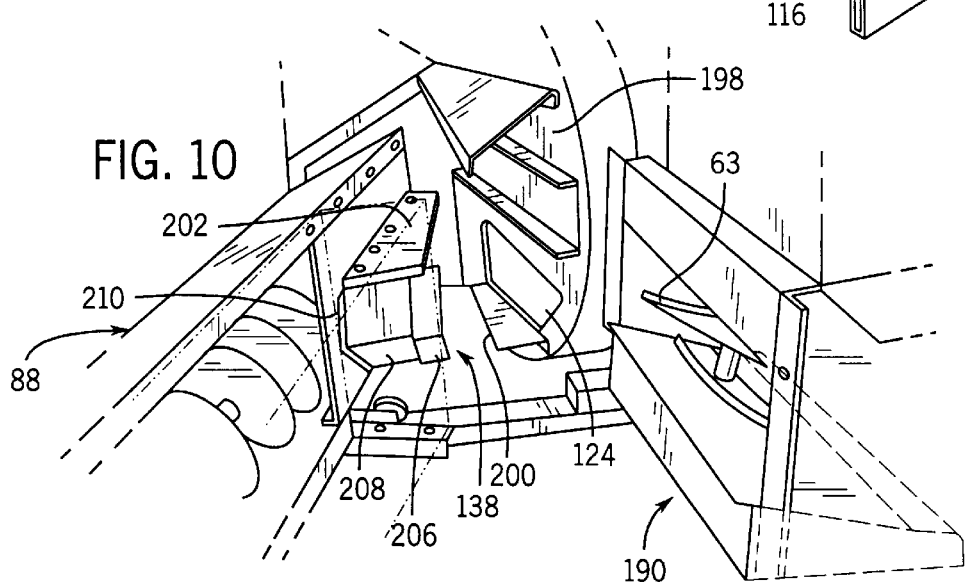

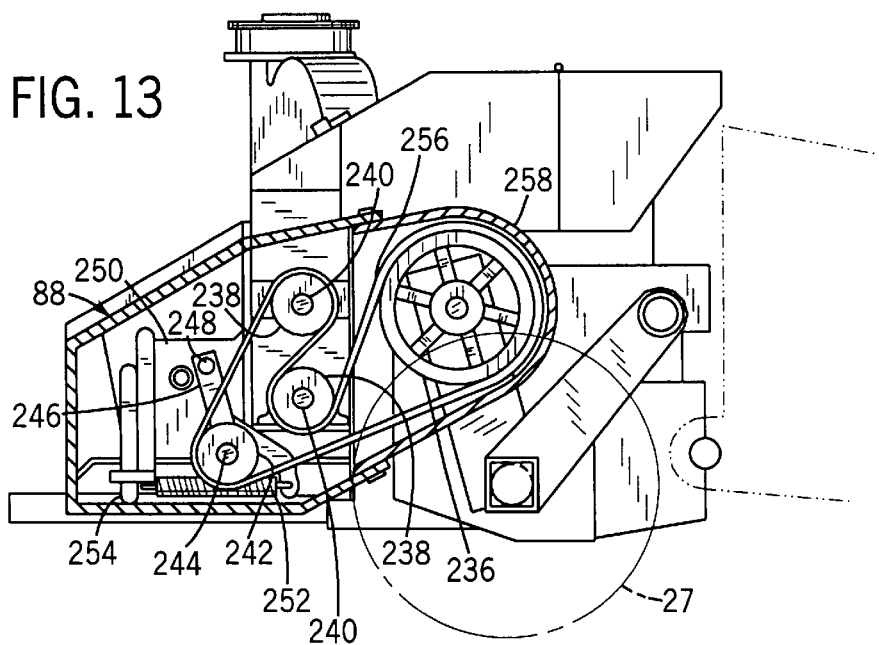
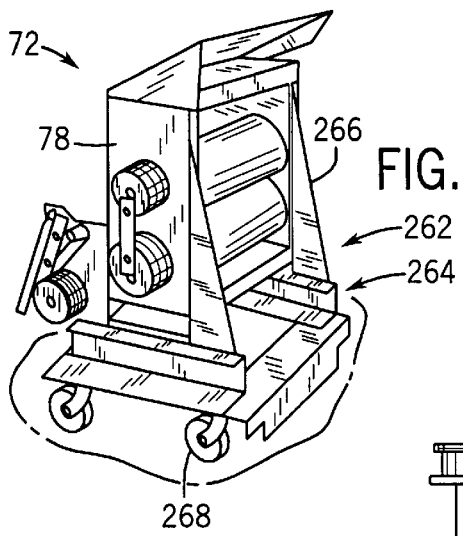
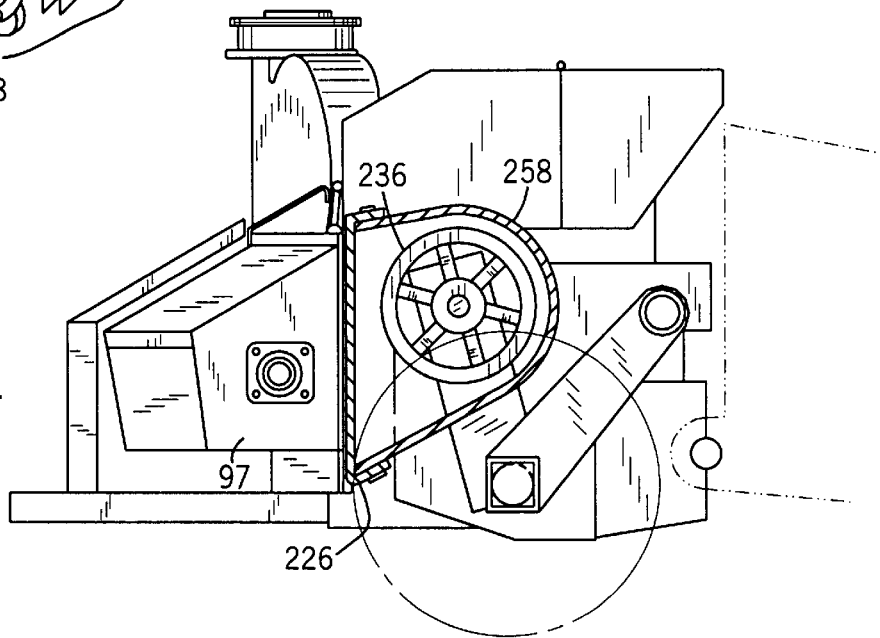

CUT CROP PROCESSING MECHANISM FOR A FORAGE HARVESTER INCORPORATING A PIVOTABLE AUGER

BACKGROUND AND SUMMARY OF THE INVENTION

This invention relates to harvesters, and more particularly to a pull-type harvester incorporating a crop processing mechanism for processing cut crop material discharged from a cutterhead arrangement forming a part of the harvester.

Pull-type forage harvesters typically utilize a cutterhead assembly located rearwardly of a crop cutting mechanism for cutting and chopping crop material supplied to the cutterhead from the crop cutting mechanism. A conveying mechanism is located downstream of the cutterhead, and typically is in the form of an auger assembly which supplies cut crop material from the cutterhead to a discharge blower, which is operable to discharge cut crop material from the forage harvester. Typically, the cut crop material is discharged into a forage box which is pulled behind the forage harvester.

In certain crop conditions, it is desirable to process the cut crop material in order to increase the digestibility of the crop material. For example, in harvesting corn, it is desirable to crack corn kernels so that they are more digestible by livestock than whole, unprocessed kernels. This further processing step can be carried out in a mill separate from the forage harvester, although this entails additional time and equipment which increases the overall cost of producing the livestock feed.

It is known to incorporate a processing mill in a self-propelled harvester. In this type of machine, a mill section can be selectively positioned in the flow path of cut crop material discharged from a cutting mechanism. When the harvester is being run in conditions in which it is desirable to process the cut crop material, the mill section is dropped into the flow path for processing the crop material. In crop conditions in which crop processing is not needed or required, the mill section is moved out of the flow path. The mill section is typically mounted to a movable mounting arrangement which is operable to lower the mill section into the flow path or raise the mill section out of the flow path when desired. The structure of the self-propelled harvester can easily carry the mill section and the movable mounting arrangement, and there is sufficient room in the flow path in a harvester of this type to accommodate the mill section.

In the past, it has not been known to incorporate a crop processing mill arrangement in a self-propelled forage harvester, which thus limits the conditions in which this type of harvester can be operated or requires a subsequent milling operation to enhance digestibility of the crop material. The configuration of pull-type harvesters is not conducive to mounting of a crop processing mill, since pull-type harvesters must meet certain size and weight requirements. Further, in the past there has been no location on a pull-type forage harvester which can readily accommodate mounting of a roller mill section, since all components are in a fixed relationship relative to each other and there is no void in the flow path having a sufficient volume to accommodate placement of a roller mill section.

Accordingly, it is an object of the present invention to provide a pull-type forage harvester with a removable roller mill section which can be selectively positioned in or removed from the flow path of cut crop material. It is a further object of the invention to provide a forage harvester which incorporates components which operate satisfactorily to cut and discharge crop material either when a roller mill section is positioned in the cut crop material flow path or removed from the cut crop material flow path. It is a further object of the invention to provide a forage harvester in which the flow path defined by the configuration of the various components can be adjusted to accommodate placement of a roller mill section therein or removal of the roller mill section therefrom. Yet another object of the invention is to provide a forage harvester which can be quickly and easily reconfigured to receive a roller mill section or to facilitate removal of the roller mill section. Yet another object of the invention is to provide a forage harvester incorporating relatively few modifications to an existing design in order to accommodate mounting of a roller mill section in the cut crop material flow path and removal of the roller mill section therefrom.

In accordance with one aspect of the invention, a forage harvester includes a cutting mechanism, a conveying mechanism located downstream of the cutting mechanism for receiving cut crop material therefrom, and a discharge mechanism located downstream of the conveying mechanism for receiving cut crop material from the conveying mechanism and discharging cut crop material from the harvester. The cutting mechanism, the conveying mechanism and the discharge mechanism cooperate to define a flow path for cut crop material through the harvester. A crop processing mechanism, which may be in the form of a roller mill section, is removably positionable within the flow path for selectively processing the cut crop material. The harvester includes an arrangement for defining the cut crop material flow path either when the crop processing mechanism is positioned within the flow path or when the crop processing mechanism is removed from the flow path. The crop processing mechanism is preferably in the form of a pair of roller members mounted to a frame, and the roller members cooperate to define an inlet therebetween. The crop processing mechanism is configured such that, when the crop processing mechanism is positioned within the flow path, cut crop material passes through the inlet and between the roller members. In a preferred arrangement, the crop processing mechanism is selectively positionable between the cutting mechanism and the conveying mechanism. The arrangement for defining the cut crop material flow path is preferably in the form of a movable mounting arrangement for a component of the harvester which enables the component to be placed in a first position when the crop processing mechanism is removed from the flow path and in a second position when the crop processing mechanism is placed in the flow path. The movable mounting arrangement may be associated with any component of the harvester, and may representatively be in the form of a movable mounting arrangement for the conveying mechanism which provides movement of the conveying mechanism between a first position when the crop processing mechanism is removed from the flow path and a second position when the crop processing mechanism is positioned within the flow path. In the first position, the conveying mechanism is positioned such that an inlet defined by the conveying mechanism is directly adjacent an outlet defined by a housing associated with the cutting mechanism for receiving crop material directly from the cutting mechanism. When the conveying mechanism is in the second position, the crop processing mechanism is in place between the inlet of the conveying mechanism and the outlet of the cutting mechanism housing, such that crop material from the cutting mechanism is supplied through the crop processing mechanism to the inlet of the conveying mechanism. In one form, the conveying mechanism may be in the form of an auger assembly including an auger housing and an auger member received within the auger housing. The auger housing and the auger are both movable between the first and second positions, and the auger housing defines an outlet which is located adjacent an inlet associated with a discharge mechanism, such as a blower for discharging cut crop material from the harvester. The discharge blower inlet and the cutting mechanism outlet are fixed in positioned relative to each other, and movement of the auger assembly between its first and second positions is operable to change the position of the auger housing outlet relative to the discharge blower inlet and the position of the auger housing inlet relative to the cutting mechanism housing outlet. When the crop processing mechanism is removed and the auger assembly is in its first position, the auger housing outlet is located directly adjacent the discharge blower inlet so that cut crop material is discharged directly from the auger housing outlet into the discharge blower inlet. In this position, a space is formed between the cutting mechanism housing outlet and the auger housing inlet, and a first filler member is placed within the space and defines a passage which supplies cut crop material from the cutting mechanism housing outlet to the auger housing inlet. When the crop processing mechanism is in place and the auger assembly is in its second position, the inlet of the crop processing mechanism is disposed directly adjacent the cutting mechanism housing outlet so as to receive cut crop material therefrom, and the inlet of the auger housing is disposed directly adjacent the outlet of the crop processing mechanism for receiving cut and processed crop material therefrom. The outlet of the auger housing is spaced slightly from the inlet of the discharge blower, and a second filler member is located within the space and defines a passage which provides flow of cut and processed crop material from the auger housing to the discharge blower inlet.

The invention further contemplates a method of modifying operation of a forage harvester to selectively incorporate a crop processing mechanism, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view showing a pull-type harvester adapted to incorporate a selectively removable crop processing mechanism in accordance with the present invention;

FIG. 2 is a top plan view of the harvester of FIG. 1;

FIG. 3 is a partial top plan view similar to FIG. 2 with portions broken away, showing a removable crop processing mechanism disposed within the flow path of cut crop material through the harvester;

FIG. 5 is a top plan view similar to FIG. 3, showing pivoting movement of the auger assembly to an open position for installation or removal of the crop processing mechanism;

FIG. 9 is a partial exploded isometric view showing the auger assembly and the crop processing mechanism incorporated into the harvester of FIG. 1, including the components mounted to the auger assembly and the cutterhead assembly for accommodating the crop processing mechanism;

FIG. 10 is a partial isometric view showing the components of the harvester of FIG. 1 in place for mounting of the crop processing mechanism;

FIG. 13 is a section view taken along line 13—13 of FIG. 3, showing a drive arrangement for driving the crop processing assembly;

FIG. 14 is a view similar to FIG. 13 without the crop processing assembly in place;

FIG. 15 is an isometric view of the crop processing assembly for incorporation into the harvester of FIG. 1, as supported on a cart for use in mounting and storing the crop processing assembly when not in use and for use in installation and removal of the crop processing assembly to and from the harvester.

DETAILED DESCRIPTION OF THE INVENTION

Figure 4:
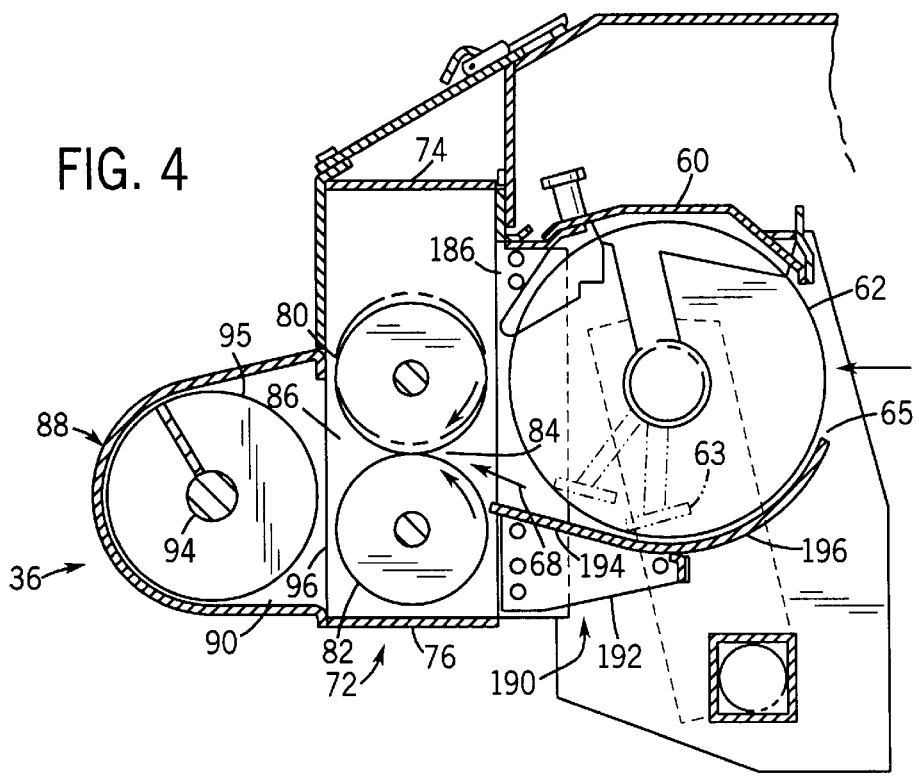
FIG. 4 is a section view taken along line 4—4 of FIG. 3.

Referring to FIG. 1, a pull-type forage harvester 20 constructed in accordance with the invention is adapted for placement between a tow vehicle such as a tractor 22 and a towable collection vehicle such as a forage box 24. While the drawings illustrate harvester 20 as discharging into a towable vehicle such as forage box 24, it should be understood that harvester 20 may be used to discharge cut crop material into any other collection receptacle, such as into the box of a truck or any other arrangement as is known in the art.

Generally, harvester 20 includes a frame 26 (FIG. 2) carrying a set of ground-engaging wheels 27 and having a draw bar 28 extending forwardly therefrom and adapted for removable connection to a hitch 30 associated with tractor 22. A jack 32 is mounted to draw bar 28 for movement between a raised position as shown in FIG. 1, and a lowered position as will be explained for engaging the ground to support harvester 20 when it is disconnected from tractor 22.

Referring to FIG. 2, harvester 20 further generally includes a cutterhead section 34, a conveying section 36 and a discharge section 38. These components are driven through rotary power supplied by a shielded drive line assembly, shown generally at 40, which is interconnected via a drive shaft 42 with a power take off associated with tractor 22, again in a manner as is known.

Referring to FIG. 3, drive line assembly 40 generally includes an input drive shaft 44 which is driven in response to rotation of drive shaft 42 and which supplies power to a gear box 46 through a universal joint 48 and an input shaft 50. Gear box 46 provides output power to a laterally extending output shaft 52 and a generally rearwardly extending output shaft 54. Lateral output shaft 52 is interconnected with a cutterhead input shaft 56 by a drive shaft 58. A universal joint 59 is engaged with each end of drive shaft 58. The inner universal joint 59 is interconnected between drive shaft 58 and gear box output shaft 52, and the outer universal joint 59 is interconnected between the outer end of drive shaft 58 and cutterhead input shaft 56.

As shown in FIGS. 3 and 4, cutterhead section 34 generally includes a cutterhead housing 60 which encloses a cutterhead assembly, shown generally at 62, in accordance with conventional technology. Cutterhead assembly 62 may be in the form of a conventional cage-type cutterhead having a series of knife blades 63 mounted at its outer peripheral surface. Cutterhead assembly 62 is operable to cut and chop crop material fed into the interior of cutterhead housing 60 through an inlet opening 65 and by a crop material intake housing 64. which receives crop material from a crop cutting mechanism, shown generally at 66 (FIG. 1). In a manner as is known, crop cutting mechanism 66 is removably engageable with forage harvester 20, and different crop cutting mechanisms are used according to the nature of the crop and other conditions. As shown in FIG. 4, cutterhead housing 60 defines a rearwardly facing discharge opening 68 through which crop material is discharged from cutterhead section 34.

Referring to FIGS. 4 and 10, a crop processing mechanism, shown generally at 72, is removably mountable to harvester 20 rearwardly of cutterhead section 34. Crop processing mechanism 72 generally includes a frame having upper and lower horizontal frame members 74, 76, respectively, and a pair of side frame members 78 extending between and rigidly mounted to upper and lower horizontal frame members 74, 76. A pair of roller members, in the form of a grooved upper roll 80 and a grooved lower roll 82, are rotatably mounted at their ends to side frame members 78 and extend therebetween. Rolls 80, 82 are located in close proximity to each other and define an inlet 84 therebetween which faces cutterhead housing discharge opening 68. Upper roll 80 is vertically movable relative to lower roll 82, for adjusting the spacing between rolls 80, 82 according to crop conditions and other operating parameters. Rolls 80, 82 cooperate to define a forwardly facing inlet 84 which faces cutterhead housing outlet 68, and a rearwardly facing outlet 86 through which cut and processed crop material is discharged from crop processing mechanism 72.

In a manner to be explained, crop processing mechanism 72 is removably engageable with harvester 20 for selectively processing crop material supplied to crop processing mechanism 72 from cutterhead section 34 through discharge opening 68.

Referring to FIGS. 3, 4 and 10, conveying section 36 is located rearwardly of crop processing mechanism 72 for receiving cut and processed crop material from outlet 86 and for conveying the cut and processed cropped material to discharge section 38. Conveying section 36 includes an auger housing 88 defining a laterally extending internal passage 90, and an auger member 92 located within passage 90. Auger member 92 includes a central shaft 94 and flighting 95 connected thereto in any satisfactory manner, such as by welding, and is operable to rotate within passage 90 to transfer cut and processed crop material laterally toward discharge section 38. Auger housing 88 includes a forwardly facing inlet 96 located rearwardly of crop processing mechanism outlet 86, having a width corresponding to that of rolls 80, 82 and crop processing mechanism outlet 86.

Auger 92 is rotatably mounted at its outer end to an end wall 97 defined by auger housing 88, and at its inner end to an end wall 98 defined by auger housing 88. Auger shaft 94 includes an extension 100 which extends from auger housing end wall 98, and which is drivingly interconnected with gear box output shaft 54 through a right angle gear reducer 102 and an auger drive shaft 104. An outer universal joint 106 is engaged between auger shaft extension 100 and auger drive shaft 104, and an inner universal joint 106 is engaged between auger drive shaft 104 and an output shaft 105 of gear reducer 102.

Referring to FIGS. 3 and 5, frame 26 includes a series of frame members including a side frame member 110, a laterally extending rear frame member 112 and an inner frame member 114. A pair of ears 116 are mounted to side frame member 110 and extend inwardly therefrom.

An auger support frame section 118 is pivotably mounted at an inner end thereof to and between ears 116. Auger housing 88 is mounted to auger support frame section 118 and is carried thereby along with auger member 92. A vertically extending pivot pin 120 is engaged within aligned vertical openings formed in ears 116 and in the inner end of auger support frame section 118 located between ears 116. In this manner, auger housing 88 and auger 92 are pivotable on harvester 20 about a vertical pivot axis defined by the longitudinal axis of pivot pin 120 between an opened position as shown in FIG. 5 and first and second closed positions as shown in FIGS. 3, 4 and 6.

In a first one of the closed positions as shown in FIGS. 3 and 4, auger housing 88 is connected to crop processing mechanism 72 such that auger housing inlet 96 receives cut and processed crop material directly from crop processing mechanism outlet 86. Rotation of auger 92 within auger housing internal passage 70 results in lateral, outward movement of the cut and processed crop material to an auger housing outlet, as shown at 122 in FIG. 3. Auger housing outlet 122 is spaced from an intake 124 defined by a discharge housing 126 of discharge section 38. A rotor 128 is rotatably mounted within discharge housing 126 and is driven in response to operation of gear box output shaft 54 through a drive belt 130 and a pulley 132 engaged with a rotor input shaft 134, which is mounted at its rear end to rotor 128. In this manner, the cut and processed crop material supplied to discharge housing intake 124 is expelled from discharge housing 126 by operation of rotor 128 to a discharge chute 136 engaged with a discharge tube 138 extending upwardly from discharge housing 126.

A discharge filler member 138 is positioned between auger housing outlet 122 and discharge housing intake 124. Filler member 138 includes a series of walls such as shown at 120, and is removably engageable with auger housing 88 at outlet 122. Filler member 138 defines an internal passage 142, which establishes communication between auger housing outlet 122 and discharge housing intake 124. With this arrangement, cut and processed crop material supplied to auger housing outlet 122 by auger 92 is transferred through filler member passage 142 by negative air pressure created by rotation of rotor 128, which functions to draw material into discharge housing intake 124. Filler member 138 includes an angled end surface 144 which engages the rear wall of discharge 126 at intake 124 for providing a continuous flow path for crop material from auger housing outlet 122 to discharge housing intake 124.

Figure 6:
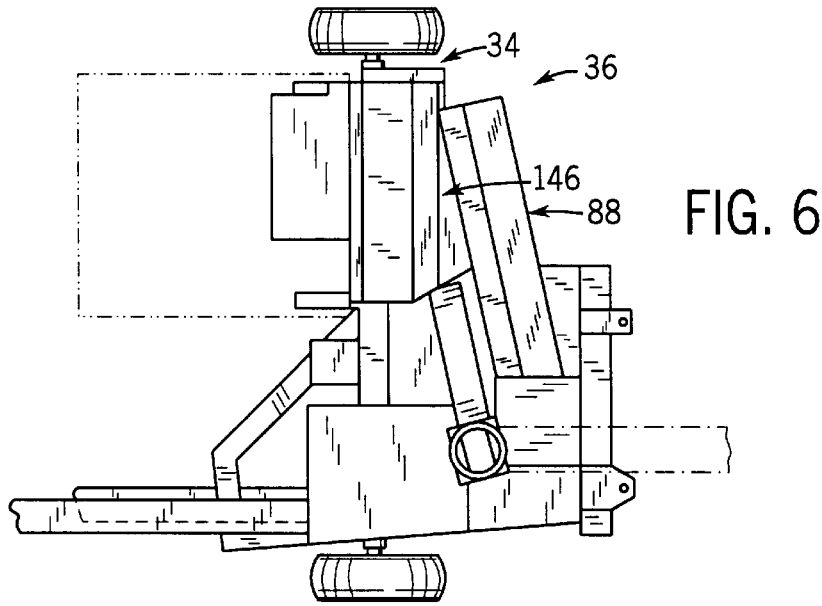
FIG. 6 is a top plan view similar to FIG. 2 showing the configuration of the harvester when the crop processing mechanism is removed.

As shown in FIG. 6, auger support frame member 118 is pivotable about pivot pin 120 to an opened position in which crop processing mechanism 72 is removed from cutterhead housing 60 and discharge filler member 138 is removed from discharge housing 126. Universal joints 106 accommodate such movement of auger 92, providing a flexible drive for auger 92 so as to accommodate its movement to varying positions on harvester 20.

Figure 8:
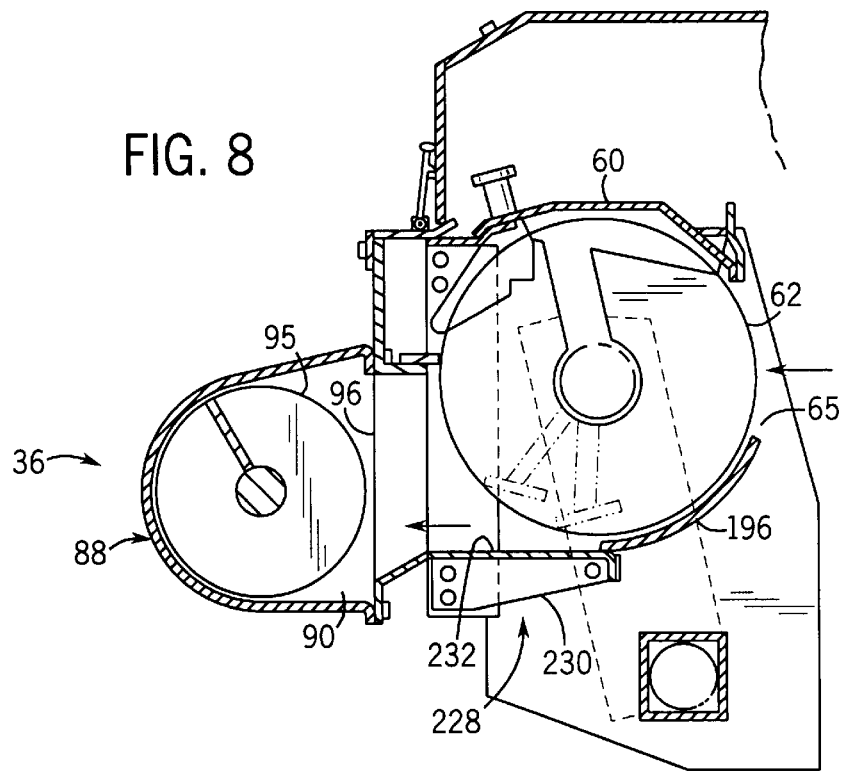
FIG. 8 is a section view taken along line 8—8 of FIG. 7.
Figure 7:
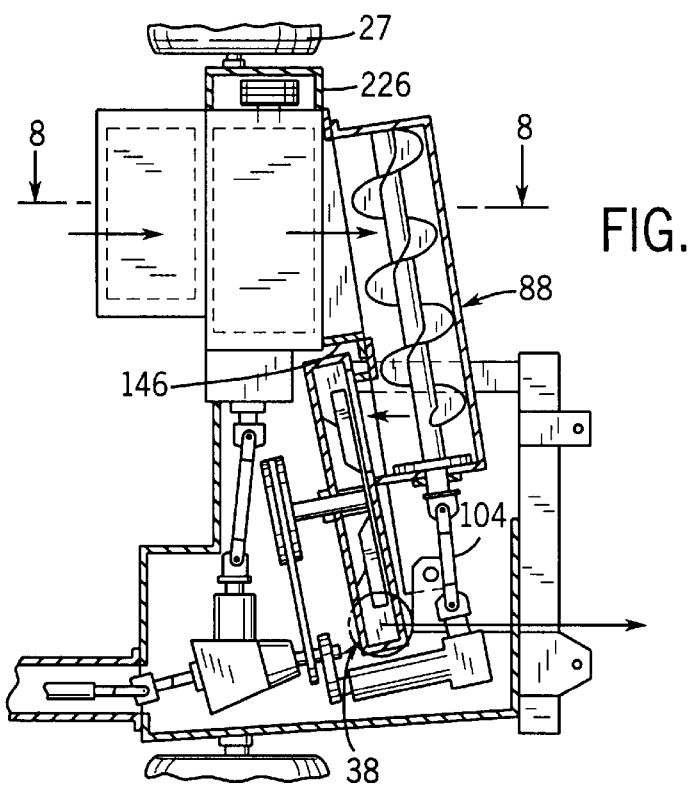
FIG. 7 is a partial top plan view similar to FIG. 3, showing the configuration of the cut crop material flow path through the harvester when the crop processing mechanism is removed.

When auger housing 88 is in its open position in FIG. 6, processing mechanism 72 and filler member 120 are removable from auger housing 88. Auger support frame section 118 is then pivoted toward cutterhead section 34 until the outer end of auger housing 88 engages the rear wall of cutterhead section 34, as shown in FIGS. 7–9. In this manner, crop processing mechanism 72 is adapted to be selectively utilized in harvester 20 according to crop conditions and other operating parameters.

Prior to movement of auger housing 88 and auger member 92 to its closed position of FIGS. 7–9, an inlet filler member 146 is engaged with auger housing 88 over its inlet 96. Inlet filler member 148 includes a series of walls 150 defining a passage 152, which establishes communication between cutterhead housing discharge opening 68 and auger housing inlet 96 when auger housing 88 is in its position of FIGS. 7–9.

Discharge filler member 138 is removed from auger housing 88 when auger housing 88 is in its open position of FIG. 6, prior to movement of auger housing 88 to its second closed position of FIGS. 7–9. Upon removal of discharge filler member 138 and movement of auger housing 88 to its closed position of FIGS. 7–9, the front wall of auger housing 88, shown at 154, engages the rearwardly facing wall of discharge housing 126, shown at 156, so as to establish direct communication between discharge housing intake 124 and auger housing outlet 122.

FIG. 9 illustrates crop processing mechanism 72, conveying section 36 and auger support frame section 118. As shown in FIG. 9, auger housing 88 defines a top wall 158 which is hinged such that the rearward portion of top wall 158 can be selectively opened to provide access to auger housing passage 90 for cleaning, maintenance, or repair. Auger housing 88 further defines a front wall 154 which separates auger housing inlet 96 and auger housing outlet 122, and a bottom wall 162 which defines the lower extent of auger housing passage 90. A pair of lower flanges, one of which is shown at 164, are provided at the lower end of auger housing 88. The inner one of flanges 164 is mounted to a tab 166 secured to a lateral frame member 168 forming a part of auger support frame section 118, and the outer one of flanges 164 is adapted for mounting to an angle mounting bracket 170 mounted to the end of lateral frame member 168. The inner end of lateral frame member 168 is mounted for pivoting movement via pivot pin 120 to harvester frame 26, which thus provides pivotable mounting of conveying section 36.

Crop processing mechanism 72 is selectively engageable with auger housing 88 over its inlet 96. The lower end of crop processing mechanism side frame member 78 defines a mounting flange 172 which is engageable with a forwardly extending mounting bracket 174 mounted to lateral frame member 168. The opposite side frame member 78 of crop processing mechanism 72 is engageable with mounting bracket 170 mounted to the end of lateral frame member 168.

Side frame members 78 further define rearwardly facing flanges 176, which are adapted to be secured to a flange 178 extending outwardly from the forward end of auger housing end wall 97, and to a depending lip 180 extending downwardly from the upper, forward end of auger housing top wall 158. In this manner, crop processing mechanism 72 is securely mounted both to auger support frame section 118 and to auger housing 88 so as to be movable therewith to the opened position of FIG. 5 and the closed position of FIG. 3.

When auger support frame section 118 is moved to its closed position of FIG. 3, a pair of forward flanges 182 defined by side frame members 78 are secured to a pair of facing flanges 184 provided at the rearward end of a pair of sidewalls defined by cutterhead housing 60, shown at 186. In this manner, crop processing mechanism 72 is maintained in engagement with cutterhead housing 60, so as to maintain crop processing mechanism and auger housing 88 in position as shown in FIG. 3. A shield, shown at 188, is engaged over the outer ends of auger housing 88 and crop processing mechanism 72 for enclosing drive components for rolls 80 and 82, in a manner which will later be explained.

A crop directing ramp member 190 is adapted for placement between cutterhead housing side walls 186 when crop processing mechanism 72 is in place. As shown in FIG. 4, ramp member 120 defines a pair of end mounting walls 192 which are engaged with cutterhead side walls 186, and an upper crop directing wall 194 which extends between end mounting walls 192. When ramp member 190 is installed, upper crop directing wall 194 defines a continuation of a curved lower wall 196 of cutterhead housing 60, for directing crop material upwardly and rearwardly toward inlet 84 of crop processing mechanism 72.

Auger housing lower wall 122 defines a forward extension 197 which extends forwardly below auger housing outlet 122. When crop processing mechanism 72 is in place, a space is defined between auger housing front wall 154 and the rear wall, shown at 198, of discharge housing 126 within which intake 124 is formed. A bottom plate 200 is mounted to discharge housing rear wall 198 below intake 124, extending rearwardly therefrom. Bottom plate 200 and forward extension 197 of auger housing bottom wall 162 cooperate to close the space between auger housing front wall 88 and discharge housing rear wall 198 either when auger housing 88 is in its closed position of FIG. 3 or its closed position of FIG. 6.

Referring to FIGS. 9 and 10, discharge filler member 138 is formed by a trapezoidal top wall 202 which is engaged with a forwardly extending lip 204 extending from conveyor housing front wall 154. The outer side of filler member 138 is defined by a pair of angled plates 206, 208 which are adapted to be secured to a flange member 210 mounted to auger housing front wall 154. Angled plates 206, 208 function to close the space between trapezoidal top wall 202 and plate 200 when auger housing 88 is in its closed position of FIG. 3.

When it is desired to remove crop processing mechanism 72 for operation in conditions which do not require processing of the harvested crop material, auger housing 88 is moved to its opened position of FIG. 5 and crop processing mechanism 72 is removed from auger support frame section 118 and auger housing 88. Trapezoidal top wall 202 and angled plates 206, 208 are also removed from auger housing 88, as is shield 188. Ramp member 190 is removed from between cutterhead housing side walls 186.

Figure 11:
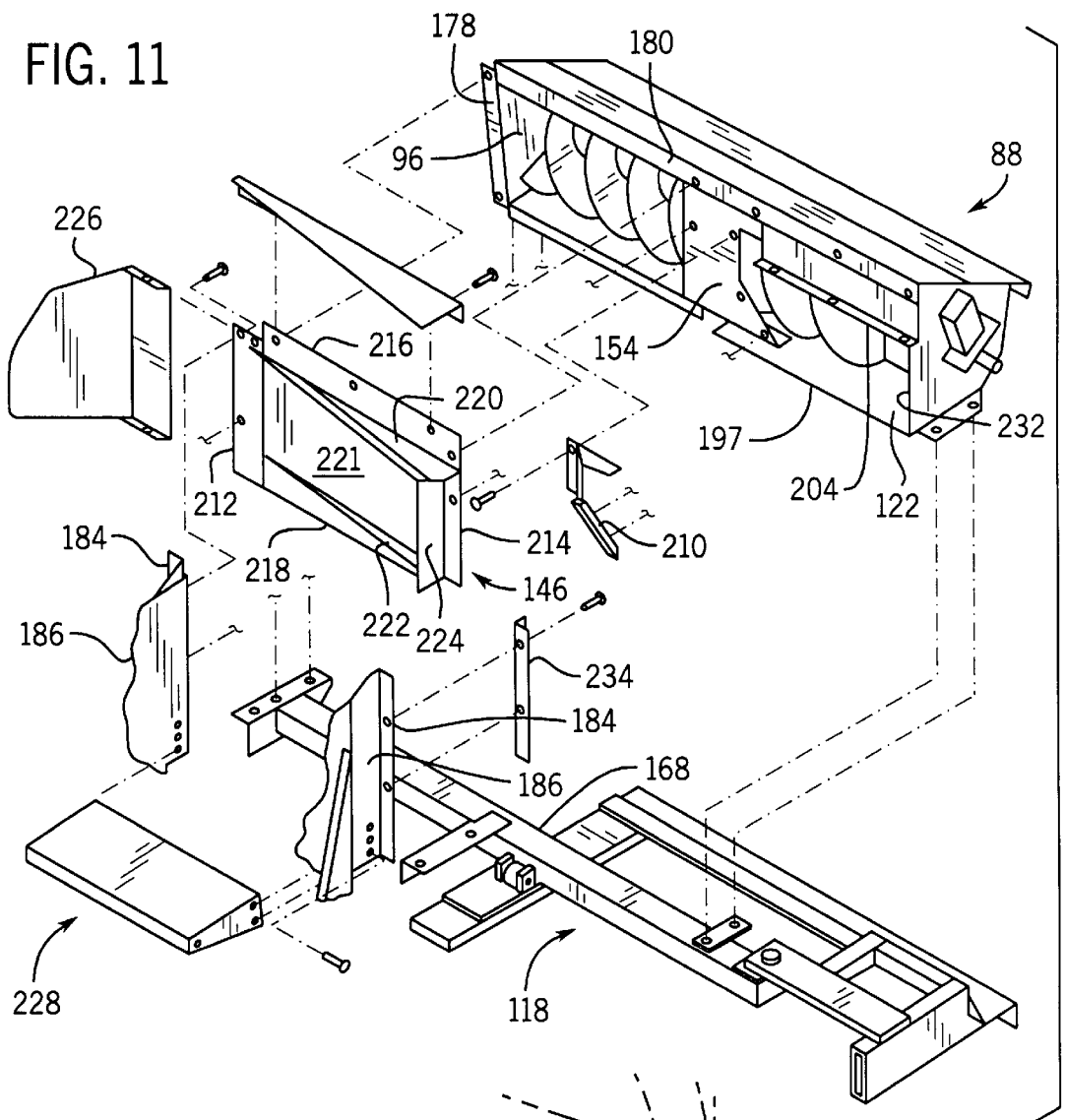
FIG. 11 is a partial exploded isometric view showing the auger assembly of the harvester of FIG. 1, including the components for accommodating removal of the crop processing mechanism and providing flow of cut crop material through the harvester.
Figure 12:
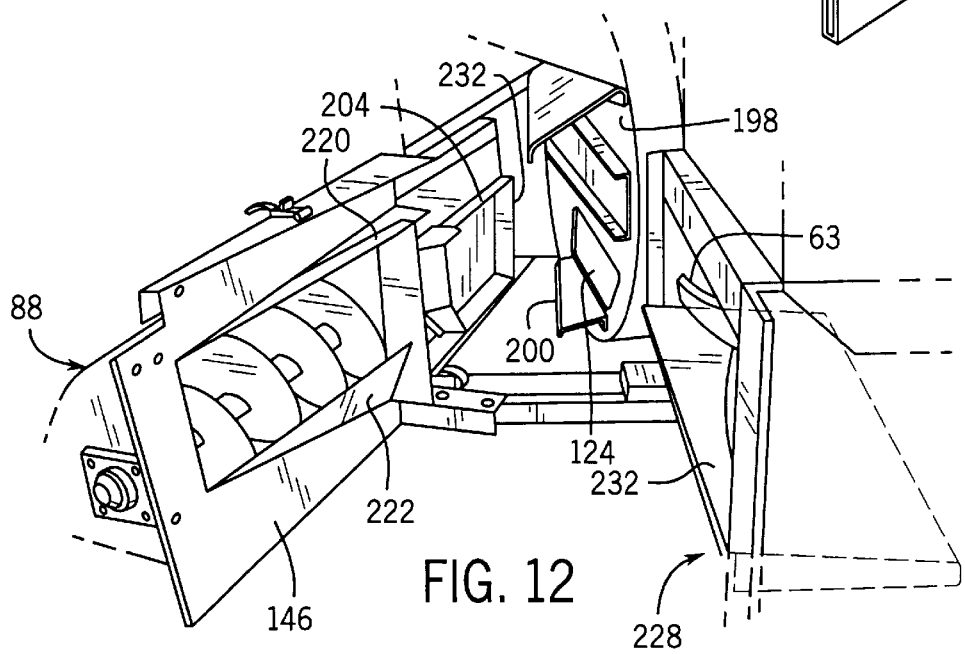
FIG. 12 is a partial isometric view similar to FIG. 10 showing the components of FIG. 12 as installed.

The components illustrated in FIGS. 11 and 12 are then mounted to harvester 20 for operating without crop processing mechanism 72. Inlet filler member 146 includes a frame defining a pair of side flanges 212, 214 and top and bottom flanges 216, 218, respectively. Side flange 212 is mounted to conveyor housing flange 178, and side flange 214 is mounted to conveyor housing front wall 154. The frame defined by side flanges 212, 214 and top and bottom flanges 216, 218, respectively, surrounds an opening 221 in filler member 146, and top and bottom triangular plates 220, 222, respectively, extend forwardly from the upper and lower edges, respectively, of opening 221. A side plate 224 extends forwardly from the inner ends of top and bottom triangular plates 220, 222, respectively.

For reasons to be explained hereafter, a shield member 226 is engageable with the outer end of side flange 212.

A ramp member 228 is adapted for placement between cutterhead housing side walls 186. Referring to FIGS. 8 and 11, ramp member 228 includes a pair of end walls 230 and an upper crop directing wall 232 extending therebetween. When ramp member 228 is installed, upper crop directing wall 232 is configured to form a continuation of cutterhead housing bottom wall 196 for directing crop material from cutterhead 60 rearwardly to auger housing passage 90 when auger housing 88 is in its closed position of FIG. 7.

With this arrangement, filler member 146 functions to enclose the triangular gap formed between cutterhead housing discharge opening 68 and auger housing inlet 96 when crop processing mechanism 72 is removed and auger housing 88 is in its closed position of FIG. 7. Angled flange member 210 remains in engagement with auger housing front wall 154 adjacent the outer edge of auger housing outlet 122. Forward extension 197 of auger housing bottom wall 162 cooperates with plate 200 to close the lower extent of the space defined between auger housing outlet 122 and discharge housing intake 124, and flange member 210 functions to engage discharge housing rear wall 156 to close one side of the space. The side opposite flange member 210 is closed by engagement of a forward extension 232 of auger housing end wall 98 with discharge housing rear wall 156, and lip 204 engages discharges rear wall 156 to close the top of the space between auger housing outlet 122 and discharge housing intake 124. Auger housing outer flange 178 is employed to secure the outer end of auger housing 88 to flange 184 of cutterhead housing 60, and an angle member 234 is engaged between inner flange 184 and cutterhead housing 88 for securing auger housing 88.

Referring to FIG. 13, a pulley 236 is mounted to the shaft of cutterhead assembly 62, which extends outwardly from cutterhead housing side wall 186. A pair of pulleys 238 are mounted to extensions of shafts 240 to which rolls 80 and 82 are mounted and which extend outwardly of outer side frame member 78. A tensioning pulley 242 is mounted to a stub shaft 244, which in turn is secured to an arm 246 pivotably mounted by a pivot pin 248 to a rearwardly extending plate 250 mounted to and extending from outer side frame member 78 of crop processing mechanism 72. A tensioning spring 252 is engaged between the lower, forward end of arm 246 and a mounting bracket 254 mounted to the rearward end of plate 250.

A series of belts 256 are trained about pulleys 236, 238 and 242. Belts 256 are received within aligned grooves formed in each of pulleys 236, 248 and 242, and function to impart rotation to crop processor mechanism rolls 80 and 82 during operation of harvester 20. Spring 252 functions to maintain tension in belts 256, and belts 256 are trained about pulleys 238 so as to provide rotation of rolls 80 and 82 in opposite directions so as to direct crop material therebetween. Spring 252 also enables arm 246 to be pivoted in a counterclockwise direction, when it is desired to engage or remove belts 256.

An arcuate shield 258 is mounted to the outer one of cutterhead housing side walls 186 for partially enclosing pulley 236. When shield 188 is mounted over the outer end of auger housing 88 and the outer end of crop processing mechanism 72, shield 188 functions to fully enclose the drive components illustrated in FIG. 13. Shield 188 is removed upon removal of crop processing mechanism 72, and is replaced with shield 226. As shown in FIG. 14, shield 226 cooperates with shield 258 to enclose pulley 236 when auger housing 88 is moved to its closed position of FIG. 7.

It can thus be appreciated that belts 256 are trained about pulleys 236, 238 and 242 when crop processing mechanism 272 is in place, so as to impart rotation to rolls 80, 82 in response to rotation of cutterhead assembly 62. Belts 256 are disengaged from pulleys 236, 238 and 242 when it is desired to remove crop processing mechanism 272.

FIG. 15 illustrates a cart 256 for supporting crop processing mechanism 72 when removed from harvester 20, and for use in mounting and removal of crop processing mechanism 72 to and from harvester 20. Cart 256 includes a base 264 and a pair of side uprights 266. A series of rollers 268 are mounted to base 264 for providing mobility of cart 262.

When not in use, crop processing mechanism 72 is engaged with uprights 266 in generally the same manner as crop processing mechanism 72 is engageable with cutterhead housing side walls 186.

Figure 16:
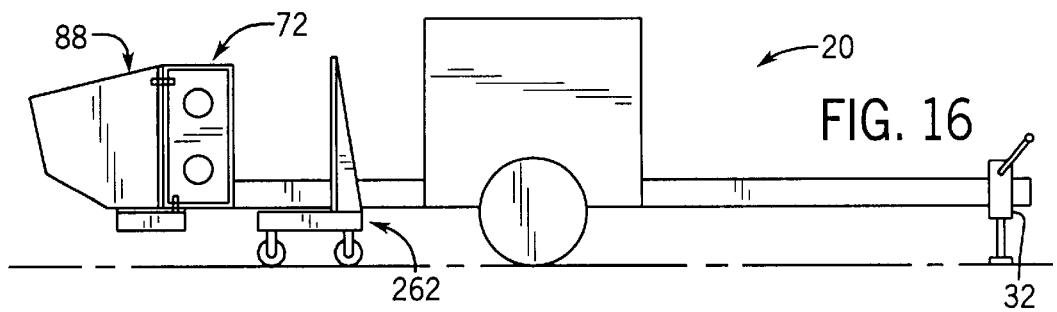
FIGS. 16–19 are schematic side elevation views showing the manner in which the cart of FIG. 15 is utilized to install and remove the crop processing assembly to and from the harvester of FIG. 1.
Figure 17:
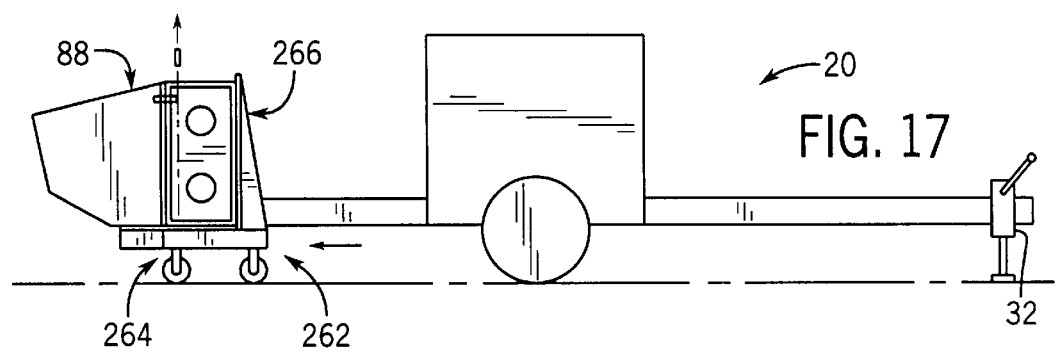
Figure 18:
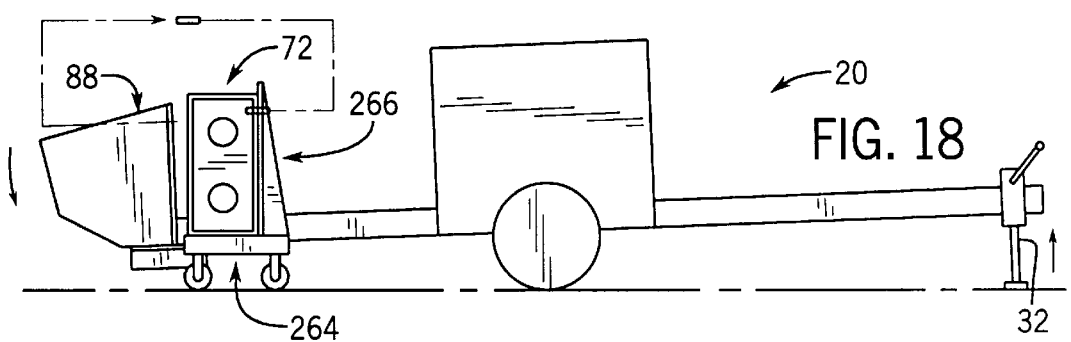
Figure 19:
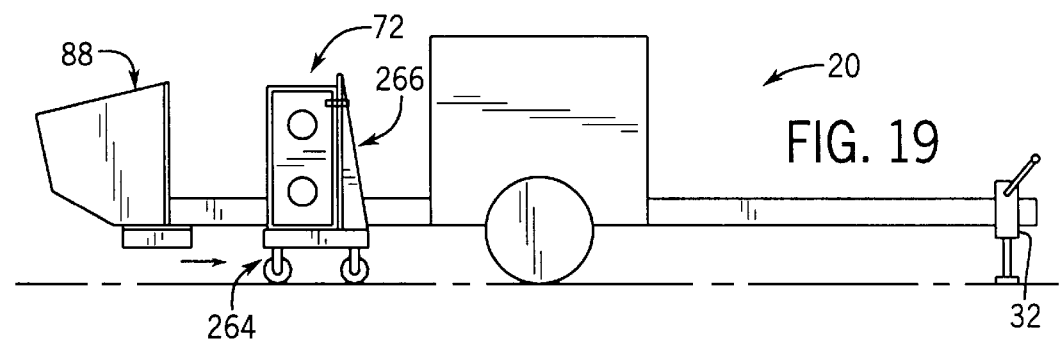

When it is desired to remove crop processing mechanism 72 from auger housing 88, cart 262 is wheeled into the position as shown in FIG. 16 into the open space between auger housing 88 and cutterhead housing 60. Jack 32 is operated so as to raise crop processing mechanism 72 an amount sufficient to position cart base 264 below crop processing mechanism 72, as shown in FIG. 17. Crop processing mechanism 72 is then mounted to uprights 266 in the same manner as it is mounted to cutterhead housing sidewalls 186, as described previously, and the fasteners securing crop processing mechanism 72 to auger housing 88 are then removed such that crop processing mechanism 72 is fully supported by cart 262. Alternatively, if desired, the same set of fasteners used to mount crop processing mechanism 72 to auger housing 88 can first be removed from auger housing 88 and then subsequently used, as shown in FIG. 18, to secure crop processing mechanism 72 to uprights 266. In addition, the same fasteners used to secure the lower extent of crop processing mechanism 72 to auger support frame section 118 are used to engage the lower extent of crop processing mechanism 72 with base 264 of cart 262. Cart 262 is then wheeled away from the space between auger housing 88 and cutterhead housing 60, and crop processing mechanism 72 is moved to a storage location until its use is again required. To mount crop processing mechanism 72 to auger housing 88, the above-described steps are reversed and jack 32 is used to control the elevation of auger housing 88 in order to accommodate installation or removal of crop processing mechanism 72. With this arrangement, crop processing mechanism 72 can be installed or replaced without the need for an overhead hoist to lift or lower crop processing mechanism 72 relative to harvester 20 for installation or removal.

It can thus be appreciated that the invention provides a relatively simple arrangement for incorporating a crop processing mill into a pull-type forage harvester. The general components of prior forage harvesters are employed, and the overall configuration of the forage harvester flow path is simply altered in order to accommodate placement or removal of a crop processing mill into the flow path. While the crop processing mill has been shown and described as being positioned between the cutterhead and the auger, it should be understood that the mill could be placed at any location in the crop material flow path while still providing satisfactory operation and processing of cut crop material. Further, while the invention has been shown and described in connection with a movable auger assembly which accommodates placement or removal of the crop processing mill, it should also be understood that other components of the harvester could be movably mounted for accommodating the crop processing mill, such as the cutterhead assembly or the discharge assembly.

Various alternatives and embodiments are contemplated as being within the scope of the following claims particularly pointing out and distinctly claiming the subject matter regarded as the invention.

I claim:

1. A cut crop material moving arrangement for a forage harvester including a frame, a cutterhead, and a discharge blower having an intake, comprising:
   a conveying mechanism defining at least a portion of a flow path for cut crop material between the cutterhead and the intake of the discharge blower, wherein the conveying mechanism is movably mounted to the frame; and
   a removable crop processing assembly selectively positionable within the flow path between the cutterhead and the conveying mechanism;
   wherein the conveying mechanism is movable between a first position within the flow path when the crop processing assembly is removed for receiving cut crop material from the cutterhead and supplying cut crop material from the cutterhead to the intake of the discharge blower, and a second position within the flow path when the crop processing assembly is positioned between the cutterhead and the conveying mechanism for receiving cut crop material from the crop processing assembly and supplying cut crop material from the crop processing assembly to the intake of the discharge blower.

2. The arrangement of claim 1, wherein the conveying mechanism comprises an auger disposed within an auger housing, and wherein the auger and the auger housing are movable between the first and second positions.

3. The arrangement of claim 2, wherein the auger and auger housing are pivotably mounted to the frame.

4. The arrangement of claim 3, wherein the auger defines a longitudinal axis of rotation, and wherein the auger is rotatable in response to operation of a power input including a flexible drive element accommodating pivotable movement of the auger and the auger housing.

5. The arrangement of claim 4, wherein the flexible drive element comprises a universal joint which receives rotary power from a drive system associated with the forage harvester and which transfers rotary power to the auger.

6. The arrangement of claim 3, wherein the crop processing assembly defines an outlet which opens in generally the same direction as the discharge blower intake when the crop processing assembly is positioned between the cutterhead and the conveying mechanism, wherein the auger housing defines an inlet for receiving cut crop material either from the outlet of the crop processing assembly when the auger and auger housing are in the second position, or from the cutterhead when the auger and auger housing are in the first position, and wherein the auger housing defines an outlet for supplying cut crop material to the discharge blower intake when the auger and auger housing are in both the first and second positions.

7. The arrangement of claim 6, wherein, when the auger and auger housing are in the second position, the auger housing is engaged with the crop processing assembly such that cut crop material passes directly from the crop processing assembly to the auger housing inlet, and wherein the auger housing outlet is separated from the discharge blower intake by a gap, and further comprising a first gap filler member adapted to be interposed between the auger housing outlet and the discharge blower intake and defining a passage within the flow path for providing flow of cut crop material therebetween.

8. The arrangement of claim 7, wherein, when the auger and auger housing are in the first position, the auger housing is engaged with the discharge blower such that cut crop material passes directly from the auger housing outlet to the discharge blower intake, and wherein the auger housing inlet is separated from an outlet defined by the cutterhead by a gap, and further comprising a second gap filler member adapted to be interposed between the auger housing inlet and the cutterhead outlet and defining a passage within the flow path for providing flow of cut crop material therebetween.

9. A harvester, comprising:
   a frame;
   a cutting mechanism mounted to the frame for cutting crop material;
   a conveying mechanism for moving cut crop material away from the cutting mechanism;
   a discharge mechanism located downstream of the conveying mechanism for receiving cut crop material therefrom and discharging the cut crop material;
   wherein the conveying mechanism includes an inlet and an outlet and at least in part defines a flow path for cut crop material between the cutting mechanism and the discharge mechanism; and
   a processing assembly, wherein the processing assembly is adapted for removable mounting between the cutting mechanism and the conveying mechanism for processing cut crop material passing from the cutting mechanism to the conveying mechanism;
   wherein the conveying mechanism is movably mounted to the frame for movement between a first position within the flow path when the processing assembly is removed, in which the inlet of the conveying mechanism is positioned so as to receive cut crop material directly from the cutting mechanism, and a second position within the flow path when the processing assembly is positioned between the cutting mechanism and the conveying mechanism, in which the inlet of the conveying mechanism is positioned so as to receive cut crop material from the processing assembly.

10. The harvester of claim 9, wherein the conveying mechanism comprises an auger located within an auger housing defining an inlet and an outlet.

11. The harvester of claim 10, wherein the discharge mechanism comprises a discharge blower defining an intake opening, and further comprising means for providing passage of cut crop material from the auger housing outlet to the discharge blower intake opening when the auger and auger housing are in both the first position and the second position.

12. The harvester of claim 11, wherein the means for providing passage of cut crop material comprises a filler member defining a passage and placed between the auger housing outlet and the discharge blower intake opening when the auger and auger housing are in the second position, and further comprises engagement of the auger housing with the discharge blower for providing direct flow of cut crop material between the auger housing outlet and the discharge blower intake opening when the auger and auger housing are in the first position.

13. The harvester of claim 10, wherein the cutting mechanism comprises a cutterhead located within a cutterhead housing defining an outlet, and further comprising means for providing passage of cut crop material from the cutterhead housing outlet to the auger housing inlet when the auger and auger housing are in the first position, and means for providing passage of cut crop material from the processing assembly to the auger housing inlet when the auger and auger housing are in the second position.

14. The harvester of claim 13, wherein the means for providing passage of cut crop material from the cutterhead housing outlet to the auger housing inlet when the auger and auger housing are in the first position comprises a filler member defining a passage and placed within the flow path between the cutterhead housing outlet and the auger housing inlet; and wherein the means for providing passage of cut crop material from the processing assembly to the auger housing inlet when the auger and auger housing are in the second position comprises direct engagement of the auger housing with the processing assembly to establish direct communication of the auger housing inlet with an outlet defined by the crop processing assembly.

15. A harvester, comprising:
a cutting mechanism enclosed within a housing defining an outlet;
a discharge mechanism operable to discharge cut crop material from the harvester, wherein the discharge mechanism defines an inlet;
a conveying mechanism interposed between the cutting mechanism outlet and the discharge mechanism inlet for transferring cut crop material from the cutting mechanism outlet to the discharge mechanism inlet, wherein the conveying mechanism is movable between first and second positions on the harvester; and
a crop material processing mechanism adapted for removable mounting in an operative position between the cutting mechanism outlet and the discharge mechanism inlet;
wherein the crop material processing mechanism and the conveying mechanism in the first position together define a first flow path for cut crop material between the cutting mechanism outlet and the discharge mechanism inlet when the crop material processing mechanism is in the operative position, and wherein the conveying mechanism is movable to the second position to define a second flow path for cut crop material between the cutting mechanism outlet and the discharge mechanism outlet when the crop material processing mechanism is removed from between the cutting mechanism and the discharge mechanism.

16. The harvester of claim 15, wherein the crop material processing mechanism is adapted for removable mounting between the cutting mechanism outlet and an inlet defined by the conveying mechanism.

17. The harvester of claim 16, wherein the conveying mechanism in the first position is positioned such that the inlet of the conveying mechanism receives cut crop material directly from the cutting mechanism housing outlet, and in the second position is positioned such that the inlet of the conveying mechanism receives cut crop material from an outlet defined by the crop material processing mechanism.

18. The harvester of claim 17, wherein the conveying mechanism comprises an auger assembly including an auger housing and an auger member received within the auger housing, wherein the auger housing is pivotable between the first and second positions, and wherein the auger member is drivingly interconnected with a flexible drive arrangement which accommodates movement of the auger member when the auger housing is pivoted between the first and second positions.

19. A pull-type harvester, comprising:
a series of components comprising a cutting mechanism; a conveying mechanism located downstream of the cutting mechanism for receiving cut crop material from the cutting mechanism; and a discharge mechanism located downstream of the conveying mechanism for receiving cut crop material from the conveying mechanism and discharging the cut crop material from the harvester;
wherein the cutting mechanism, the conveying mechanism and the discharge mechanism cooperate to define a first flow path for cut crop material between the cutting mechanism and the discharge mechanism; and
a crop processing mechanism removably engageable with the components of the pull-type harvester for selectively processing the cut crop material;
wherein at least one of the components of the harvester is movable so as to alter the configuration of the flow path when the crop processing mechanism is engaged with the components of the pull-type harvester.

20. The pull-type harvester of claim 19, wherein the crop processing mechanism comprises a pair of roller members mounted to a frame, wherein the roller members cooperate to define an inlet therebetween, wherein, when the crop processing mechanism is engaged with the components of the pull-type harvester, the cut crop material passes through the inlet and between the roller members.

21. The harvester of claim 20, wherein the crop processing mechanism is selectively engageable with the cutting mechanism and the conveying mechanism.

22. The harvester of claim 21, wherein the conveying mechanism comprises the movable component of the pull-type harvester, and includes a movable mounting arrangement which provides movement of the conveying mechanism between a first position when the crop processing mechanism is removed and a second position when the crop processing mechanism is engaged with the components of the pull-type harvester.

23. The harvester of claim 21, wherein the conveying mechanism includes a housing defining an inlet and wherein the cutting mechanism includes a housing defining an outlet, and further comprising a first directing member for placement at the cutting mechanism housing outlet for directing cut crop material to the conveying mechanism housing inlet when the crop processing mechanism is removed, and a second directing member for placement at the cutting mechanism housing outlet for directing cut crop material to the inlet of the crop processing mechanism when the crop processing mechanism is engaged between the cutting mechanism and the conveying mechanism.

24. A method of modifying operation of a pull-type forage harvester having a plurality of components including a cutting mechanism, a discharge mechanism, and a conveying mechanism which together define a flow path for cut crop material downstream of the cutting mechanism, comprising the steps of moving at least a selected one of the components on the harvester to alter the configuration of the flow path and to form a gap in the flow path downstream of the cutting mechanism and upstream of the discharge mechanism, positioning a crop processing mechanism in the gap formed in the flow path by movement of the selected component of the harvester, and securing the crop processing mechanism in the gap formed in the flow path to at least one of the components of the harvester adjacent the gap.

25. The method of claim 24, wherein the crop processing mechanism comprises a pair of roller members mounted to a frame and defining an inlet therebetween, and wherein the step of positioning the crop processing mechanism in the gap formed in the flow path comprises releasably securing the frame to the forage harvester such that the inlet between the pair of roller members is disposed within the flow path.

26. The method of claim 25, wherein the step of moving at least a selected one of the components on the harvester is carried out by altering the position of the conveying mechanism while maintaining the conveying mechanism within the flow path to accommodate placement of the crop processing mechanism in the flow path and removal of the crop processing from the flow path.

27. The method of claim 26, wherein the step of altering the position of the conveying mechanism is carried out by pivotably moving the conveying mechanism between a first position in which an inlet defined by the conveying mechanism is positioned adjacent a discharge defined by the cutting mechanism for receiving cut crop material directly therefrom, and a second position in which the conveying mechanism inlet is positioned to receive cut crop material from an outlet defined by the pair of roller members, wherein the crop processing mechanism is positioned such that the inlet between the pair of roller members receives cut crop material from the cutting mechanism outlet.

28. The method of claim 26, wherein the conveying mechanism is movable to an open position in which the gap is formed between the cutting mechanism and the conveying mechanism, and wherein the step of positioning the crop processing mechanism in the gap formed in the flow path is carried out by mounting the crop processing mechanism to a cart and positioning the cart between the cutting mechanism and the conveying mechanism.

29. The method of claim 28, wherein the step of releasably securing the frame of the crop processing mechanism to the forage harvester is carried out by supporting the crop processing mechanism on the cart while securing the frame of the crop processing mechanism to the conveying mechanism, and thereafter disengaging the crop processing mechanism from the cart and altering the elevation of the conveying mechanism so as to lift the crop processing mechanism off the cart.

30. The method of claim 29, wherein the step of altering the elevation of the conveying mechanism is carried out by operation of a ground-engaging jack carried by the forage harvester, wherein the jack is located on one side of a set of ground-engaging wheels associated with the forage harvester, and wherein the conveying mechanism is located on an opposite side of the set of wheels from the jack.

* * * * *